United States Patent
Adams

(10) Patent No.: US 6,694,853 B2
(45) Date of Patent: Feb. 24, 2004

(54) CABLE STRIPPER APPARATUS

(76) Inventor: Allan R. Adams, 767 S. Van Buren St., Stoughton, WI (US) 53589

( * ) Notice: Subject to any disclaimer, the term of this patent is extended or adjusted under 35 U.S.C. 154(b) by 85 days.

(21) Appl. No.: 09/910,328

(22) Filed: Jul. 21, 2001

(65) Prior Publication Data

US 2003/0015080 A1 Jan. 23, 2003

(51) Int. Cl.[7] .................................................. H02G 1/12
(52) U.S. Cl. .............................. 83/870; 83/431; 83/950; 29/426.4
(58) Field of Search ....................... 29/825, 861, 564.4, 29/426.4, 426.5, 426.6, 764, 762; 83/861, 870, 941, 950, 426, 431, 947, 881, 997, 924; 81/9.4, 9.44; 30/90.4, 91.1

(56) References Cited

U.S. PATENT DOCUMENTS

| | | | | |
|---|---|---|---|---|
| 2,391,721 A | * | 12/1945 | Lindeen .......................... 83/102 |
| 3,175,430 A | * | 3/1965 | Smith et al. ................. 81/9.51 |
| 3,612,111 A | * | 10/1971 | Heinrich ........................ 140/1 |
| 3,951,727 A | * | 4/1976 | Greenberg .................. 156/584 |
| 4,534,254 A | * | 8/1985 | Budzich et al. ............. 83/425.2 |
| 5,107,735 A | * | 4/1992 | Ramun et al. ................. 83/407 |
| 5,457,876 A | * | 10/1995 | Gerhard, Jr. ................. 29/751 |
| 5,542,327 A | * | 8/1996 | Schultz ........................ 83/861 |
| 5,561,899 A | * | 10/1996 | Carpenter et al. ............ 29/825 |
| 6,086,470 A | * | 7/2000 | Ranniger .................... 452/127 |
| 6,360,430 B1 | * | 3/2002 | Stepan ........................ 29/825 |

* cited by examiner

Primary Examiner—Allan N. Shoap
Assistant Examiner—Ghassem Alie
(74) Attorney, Agent, or Firm—David J. Archer

(57) ABSTRACT

A cable stripper apparatus is disclosed for stripping insulation from electric cable. The apparatus includes a framework and a drive secured to the framework. A wire feeder is rotatably secured to the framework and is rotatably driven by the drive. A guide is provided for guiding the cable towards the wire feeder. Also, a cutter is connected to the framework adjacent to the feeder. The arrangement is such that when the cable is guided by the guide towards the wire feeder, the wire feeder and the cutter cooperate with each other for stripping the insulation from the cable.

17 Claims, 4 Drawing Sheets

CABLE STRIPPER APPARATUS

BACKGROUND OF THE INVENTION

Field of the Invention

The present invention relates to a cable stripper apparatus for stripping insulation from electric cable.

More specifically, the present invention relates to a cable stripper apparatus for stripping insulation from electrical cables so that the wire can be recycled.

When a house, office or factory is rewired, enormous quantities of scrap electrical cable are generated. In the past, in an attempt to recover the valuable metal such as copper from the used cable, such scrap cable was burnt so as to remove the plastic insulation therefrom. However, with the advent and implementation of rigorous Environmental Protection Agency (EPA) and Department of Natural Resources regulations prohibiting burning of waste plastics on electrical cables, the recovery of such valuable metal has been challenging. Primarily, the EPA and Department of Natural Resources regulations introduced approximately 15 years ago were introduced in order to prevent the release into the atmosphere of harmful gases given off during burning of plastics materials such as wire insulation.

More specifically, the approximate value of stripped copper wire is 50 cents per lb. However, the value of unstripped copper wire is only approximately 16 cents per lb. The cable stripping apparatus according to the present invention provides an extremely efficient means for rapidly removing insulation from electrical cables of various gauges.

Therefore, it is a primary feature of the present invention to provide a cable stripper apparatus for stripping insulation from electric cables that overcomes the problems associated with prior art arrangements.

Another feature of the present invention is the provision of cable stripper apparatus for stripping insulation from an electric cable that enables the user thereof to remove insulation without burning the insulation.

A further feature of the present invention is the provision of a relatively low cost cable stripper apparatus for stripping insulation from electric cable.

Another feature of the present invention is the provision of cable stripper apparatus for stripping insulation from electric cable that enables recovery of valuable copper and other metals from a cable and which permits the recovery of the plastics insulation material for recycling thereof.

Other features and advantages of the present invention will be readily apparent to those skilled in the art by a consideration of the detailed description of a preferred embodiment of the present invention contained herein.

SUMMARY OF THE INVENTION

The present invention relates to a cable stripper apparatus for stripping insulation from electric cable. The apparatus includes a framework and a drive secured to the framework. A wire feeder is rotatably secured to the framework and is rotatably driven by the drive. A guide is provided for guiding the cable towards the wire feeder. Also, a cutter is connected to the framework adjacent to the feeder. The arrangement is such that when the cable is guided by the guide towards the wire feeder, the wire feeder and the cutter cooperate with each other for stripping the insulation from the cable.

In a more specific embodiment of the present invention, the framework includes a first member of C-shaped cross sectional configuration, the first member having a first and a second end. The framework also includes a second member of C-shaped cross sectional configuration, the second member having a first and a second extremity. The first and second members are disposed spaced and parallel relative to each other.

Also, the first member further includes a first bearing which is disposed between the first and second end of the first member for rotatably supporting the wire feeder. A second bearing is disposed between the first and second extremity of the second member for rotatably supporting the wire feeder so that the wire feeder is rotatably disposed between the first and second bearings.

Furthermore, the drive includes an electric motor and a transmission disposed between the motor and the wire feeder so that when the motor is connected to a source of electrical power, the motor rotates the transmission for driving the wire feeder.

In an alternative embodiment of the present invention, the drive includes a manual drive so that when the manual drive is rotated, such rotation of the manual drive rotates the wire feeder. A gearbox is disposed between the manual drive and the wire feeder, the gearbox transmitting the rotation of the manual drive to the wire feeder.

Moreover, the wire feeder includes a roller of cylindrical configuration, the roller defining a plurality of teeth for engaging the insulation. The plurality of teeth extend in a direction outwardly from an axis of rotation of the roller. More particularly, the direction of the teeth is offset forwardly relative to a radial direction, such offset being forwardly relative to a rotational direction of the roller.

The wire feeder further includes a drive shaft which is disposed coaxially relative to the roller so that the drive shaft is rotatably supported by the framework, the drive shaft being connected to the drive.

Additionally the guide includes a base and a biasing arrangement for biasing the base relative to the framework.

The guide further includes a spacer bar which is supported by the base, the spacer bar extending towards the wire feeder for guiding the electric cable towards the wire feeder. More specifically, the spacer bar has a thickness for stripping insulation from cables having a gauge within a first range. A further spacer bar is interchangeable with the spacer bar, the further spacer bar having a further thickness for stripping insulation from cables having a gauge within a second range.

Also, the guide further includes a first wall secured to the base and a second wall secured to the base. The second wall is disposed spaced and parallel relative to the first wall so that the walls define a channel therebetween for guiding the cable towards the wire feeder.

The cutter includes a blade which is disposed adjacent to the wire feeder, the blade being secured to the guide so that when the wire feeder is being rotated and the cable is guided by the guide towards the blade, the cable is fed between the wire feeder and the blade so that the blade strips the insulation from the cable.

More specifically, the blade is secured to the base so that when the wire feeder is being rotated and the cable is guided by the guide towards the blade, the cable is fed between the wire feeder and the blade so that the blade is biased by the biasing arrangement towards the wire feeder for stripping the insulation from the cable.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
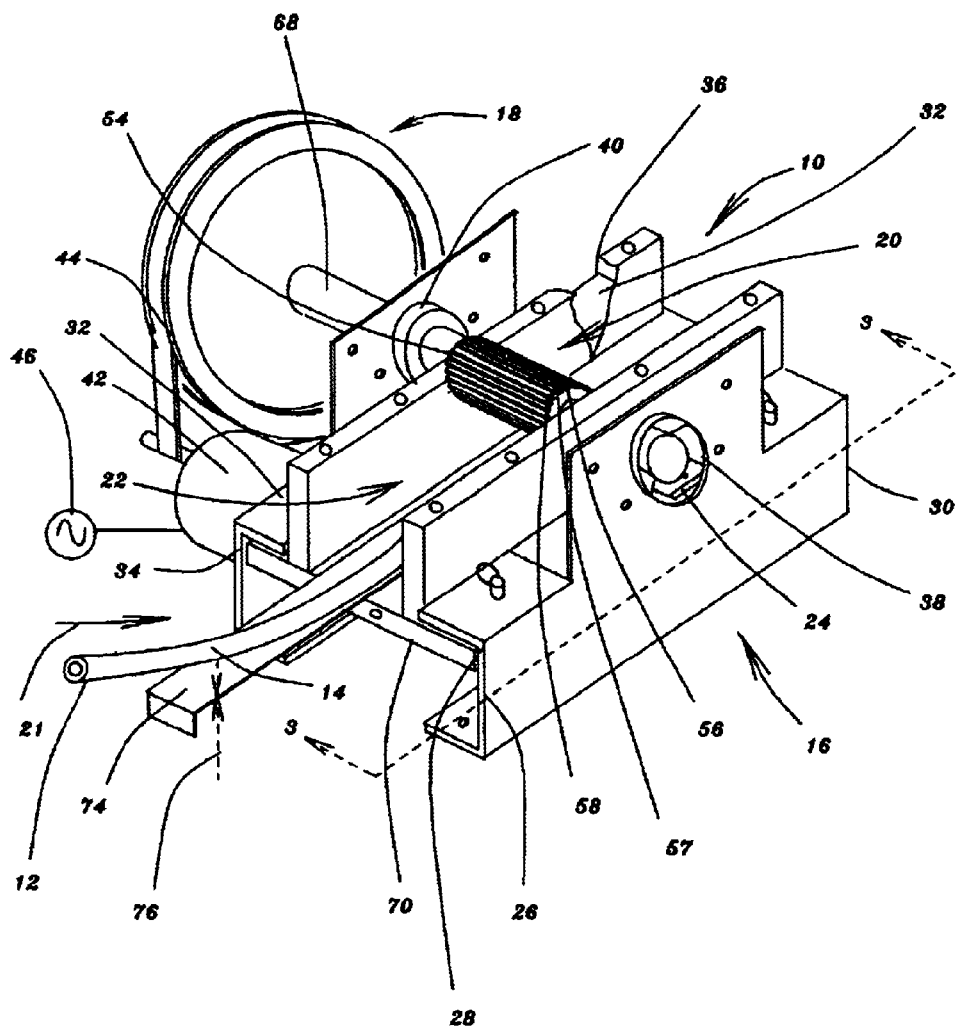
FIG. 1 is a perspective view of a cable stripper apparatus according to the present invention for stripping insulation from electric cable.

FIG. 1 is a perspective view of a cable stripper apparatus generally designated 10 according to the present invention for stripping insulation 12 from electric cable 14. As shown in FIG. 1, the apparatus 10 includes a framework generally designated 16 and a drive generally designated 18 secured to the framework 16. A wire feeder generally designated 20 is rotatably secured to the framework 16 and is rotatably driven by the drive 18. A guide generally designated 22 is provided for guiding the cable 14 towards the wire feeder 20. Also, a cutter generally designated 24 is connected to the framework 16 adjacent to the wire feeder 20. The arrangement is such that when the cable 14 is guided by the guide 22 towards the wire feeder 20 as indicated by the arrow 21, the wire feeder 20 and the cutter 24 cooperate with each other for stripping the insulation 12 from the cable 14.

In a more specific embodiment of the present invention, the framework 16 includes a first member 26 of C-shaped cross sectional configuration, the first member 26 having a first and a second end 28 and 30 respectively. The framework 16 also includes a second member 32, of C-shaped cross sectional configuration, the second member 32 having a first and a second extremity 34 and 36 respectively. The first and second members 26 and 32 are disposed spaced and parallel relative to each other.

Also, the first member 26 further includes a first bearing 38 which is disposed between the first and second end 28 and 30 respectively of the first member 26 for rotatably supporting the wire feeder 20. A second bearing 40 is disposed between the first and second extremity 34 and 36 respectively of the second member 32 for rotatably supporting the wire feeder 20 so that the wire feeder 20 is rotatably disposed between the first and second bearings 38 and 40 respectively.

Furthermore, the drive 18 includes an electric motor 42 and a transmission 44 disposed between the motor 42 and the wire feeder 20 so that when the motor 42 is connected to a source of electrical power 46, the motor 42 rotates the transmission 44 for driving the wire feeder 20.

Figure 2:
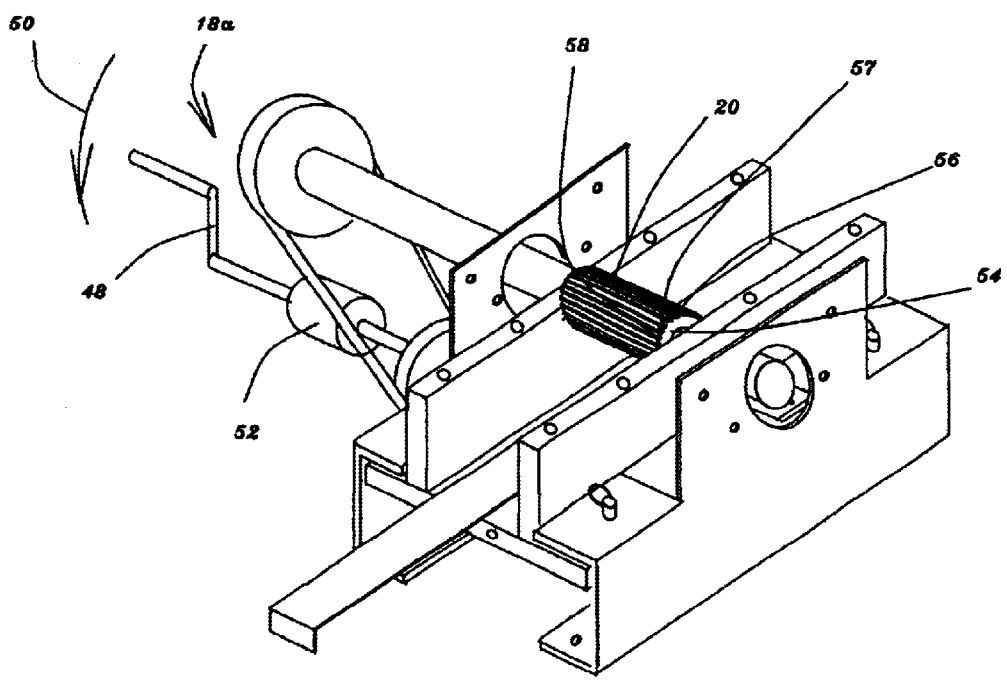
FIG. 2 is a perspective view of an alternative embodiment of the present invention.

FIG. 2 is a perspective view of an alternative embodiment of the present invention. As shown in FIG. 2, a drive generally designated 18a includes a manual drive 48 so that when the manual drive 48 is rotated as indicated by the arrow 50, such rotation 50 of the manual drive 48 rotates the wire W feeder 20. A gearbox 52 is disposed between the manual drive 48 and the wire feeder 20, the gearbox 52 transmitting the rotation 50 of the manual drive 48 to the wire feeder 20.

Moreover, as shown in FIG. 1, the wire feeder 20 includes a roller 54 of cylindrical configuration, the roller 54 defining a plurality of teeth 56, 57 and 58 for engaging the insulation 12.

Figure 3:
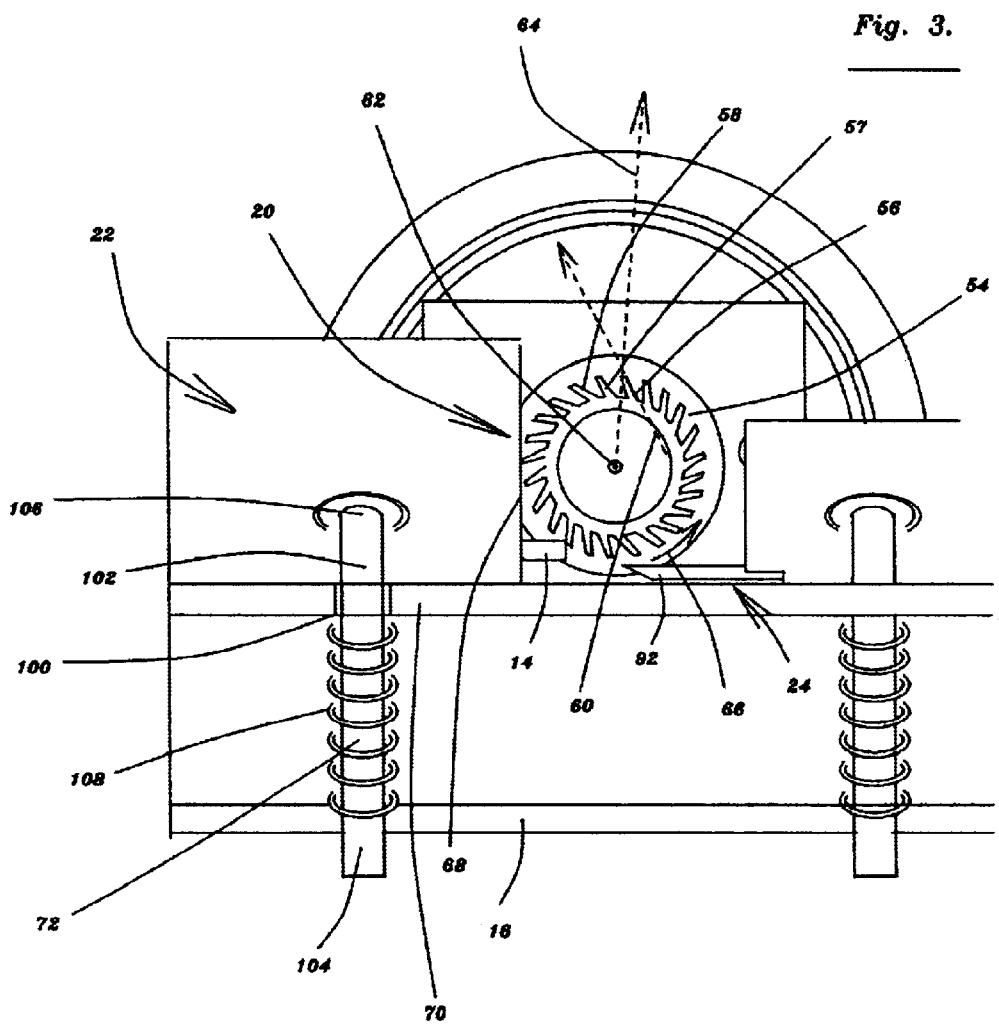
FIG. 3 is a view taken on the line 3—3 of FIG. 1.

FIG. 3 is a view taken on the line 3—3 of FIG. 1. As shown in FIG. 3, the plurality of teeth 56-58 of the roller 54 extend in a direction as indicated by the arrow 60, outwardly from an axis of rotation 62 of the roller 54. More particularly, the direction 60 of the teeth 56–58 is offset forwardly relative to a radial direction which is indicated by the arrow 64. Such offset is forwardly relative to a rotational direction as indicated by the arrow 66 of the roller 54.

The wire feeder 20 further includes a drive shaft 68 which is disposed coaxially relative to the roller 54 so that the drive shaft 68 is rotatably supported by the framework 16, the drive shaft 68 being connected to the drive 18.

Additionally the guide 22 includes a base 70 and a biasing arrangement 72 for biasing the base 70 relative to the framework 16.

As shown in FIG. 1, the guide 22 further includes a spacer bar 74 which is supported by the base 70, the spacer bar 74 extending towards the wire feeder 20 for guiding the electric cable 14 towards the wire feeder 20. More specifically, the spacer bar 74 has a thickness of 12 gauge sheet steel 76 for stripping insulation 12 from cables 14 having a gauge within a first range of 10, 8 and 6 gauge wire.

Figure 4:
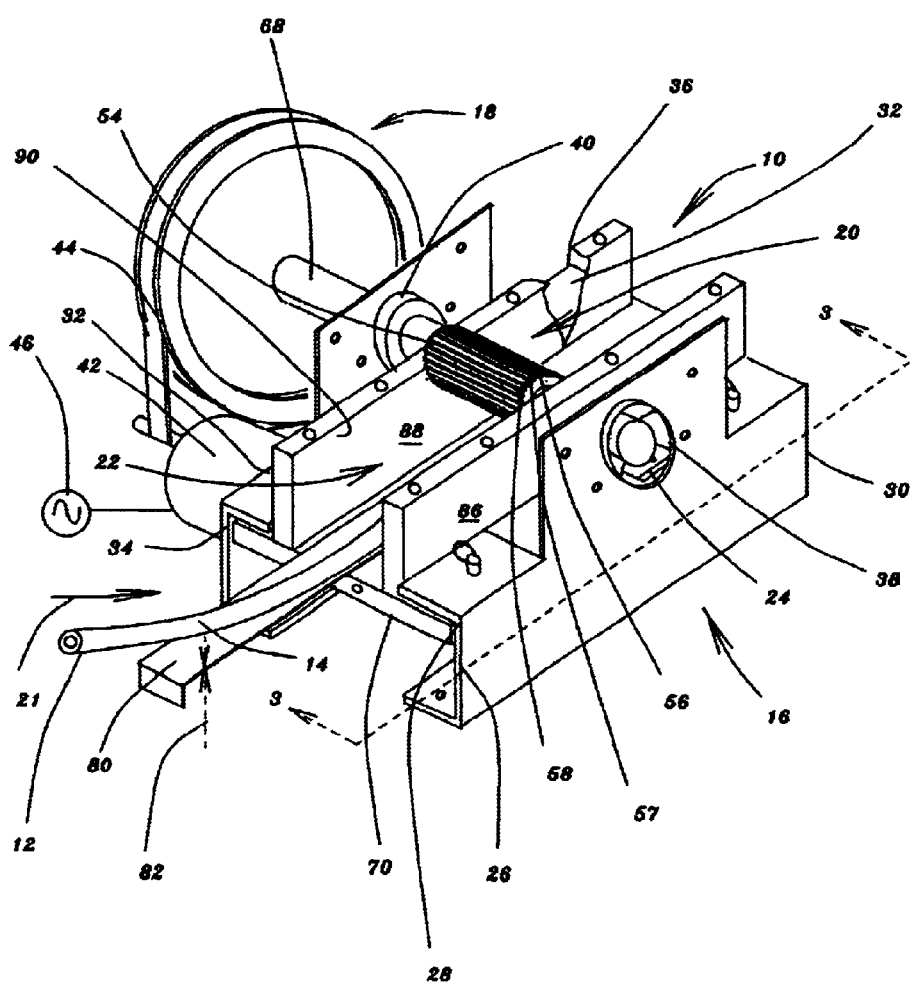
FIG. 4 is a similar view to that shown in FIG. 1 but shows a further spacer bar.

FIG. 4 is a similar view to that shown in FIG. 1. However, as shown in FIG. 4, a further spacer bar 80 is interchangeable with the spacer bar 74. The further spacer bar 80 has a further thickness of 11 gauge steel 82 for stripping insulation 12 from cables 14 having a gauge within a second range of 16, 14 and 12 gauge wire.

Also, the guide 22 further includes a first wall 86 which is secured to the base 70 and a second wall 88 which is also secured to the base 70. The second wall 88 is disposed spaced and parallel relative to the first wall 86 so that the walls 86 and 88 respectively define a channel 90 therebetween for guiding the cable 14 towards the wire feeder 20.

As shown in FIG. 3, the cutter 24 includes a blade 92 which is disposed adjacent to the wire feeder 20. The blade 92 is secured to the guide 22 so that when the wire feeder 20 is being rotated as indicated by the arrow 66 and the cable 14 is guided by the guide 22 towards the blade 92, the cable 14 is fed between the wire feeder 20, spacer bar 74 or 80 and the blade 92 so that the blade 92 strips the insulation 12 from the cable 14.

More specifically, the blade 92 is secured to the base 70 so that when the wire feeder 20 is being rotated and the cable 14 is guided by the guide 22 towards the blade 92, the cable 14 is fed between the wire feeder 20 and the blade 92 so that the blade 92 is biased by the biasing arrangement 72 towards the wire feeder 20 for stripping the insulation 12 from the cable 14.

Additionally, the guide 22 includes a hole 100 defined by the base 70. A pin 102 has a proximal and a distal end 104 and 106 respectively. The distal end 106 of the pin 102 slidably extends through the hole 100 of the base 70. The proximal end 104 of the pin 102 is secured to the framework 16. The biasing arrangement 72 includes a compression spring 108 disposed between the base 70 and the framework 16 for biasing the base 70 guided by the pin 102 away from the framework 16 so that the base 70 is urged by the spring 108 towards the wire feeder 20. The cutter 24 is secured to the base 70 adjacent to the feeder 20, the arrangement being such that when the cable 14 is guided by the guide 22 towards the wire feeder 20, the wire feeder 20, spacer bar 74 or 80 and the cutter 24 cooperate with each other for stripping the insulation 12 from the cable 14.

The present invention provides a unique and efficient apparatus for reliably separating plastics insulation from wire cables for permitting recycling of both the metal and the plastics materials.

What I claim is:

1. A cable stripper apparatus for stripping insulation from an electric cable, said apparatus comprising:
    a framework;
    a drive secured to said framework;
    a wire feeder rotatably secured to said framework and rotatably driven by said drive;
    a guide for guiding the cable towards said wire feeder;
    said guide including:
        a spacer bar extending towards said wire feeder; and
        a cutter having a cutting edge disposed spaced and parallel to an axis of rotation of said wire feeder, said cutter being connected to said framework immediately adjacent to said feeder, the arrangement being such that when the cable is guided by said guide towards said wire feeder, said wire feeder, spacer bar and said cutter cooperate with each other for stripping the insulation from the cable.

2. A cable stripper apparatus as set forth in claim 1 wherein
    said framework includes:
        a first member of C-shaped cross sectional configuration, said first member having a first and a second end;
        a second member of C-shaped cross sectional configuration, said second member having a first and a second extremity, said first and second members being disposed spaced and parallel relative to each other.

3. A cable stripper apparatus as set forth in claim 2 wherein
    said first member further includes:
        a first bearing disposed between said first and second end of said first member for rotatably supporting said wire feeder;
        a second bearing disposed between said first and second extremity of said second member for rotatably supporting said wire feeder so that said wire feeder is rotatably disposed between said first and second bearings.

4. A cable stripper apparatus as set forth in claim 1 wherein
    said drive includes:
        an electric motor;
        a transmission disposed between said motor and said wire feeder so that when said motor is connected to a source of electrical power, said motor rotates said transmission for driving said wire feeder.

5. A cable stripper apparatus as set forth in claim 1 wherein
    said drive includes:
        a manual drive so that when said manual drive is rotated, such rotation of said manual drive rotates said wire feeder;
        a gearbox disposed between said manual drive and said wire feeder, said gearbox transmitting said rotation of said manual drive to said wire feeder.

6. A cable stripper apparatus as set forth in claim 1 wherein
    said wire feeder includes:
        a roller of cylindrical configuration, said roller defining a plurality of teeth for engaging the insulation.

7. A cable stripper apparatus as set forth in claim 6 wherein
    said plurality of teeth extend in a direction outwardly from an axis of rotation of said roller.

8. A cable stripper apparatus as set forth in claim 7 wherein
    said direction of said teeth is offset forwardly relative to a radial direction, such offset being forwardly relative to a rotational direction of said roller.

9. A cable stripper apparatus as set forth in claim 6 wherein
    said wire feeder further includes:
        a drive shaft disposed coaxially relative to said roller so that said drive shaft is rotatably supported by said framework, said drive shaft being connected to said drive.

10. A cable stripper apparatus as set forth in claim 1 wherein
    said guide includes:
        a base;
        a biasing arrangement for biasing said base relative to said framework.

11. A cable stripper apparatus as set forth in claim 10 wherein
    said spacer bar is supported by said base, said spacer bar extending towards said wire feeder for guiding the electric cable towards said wire feeder.

12. A cable stripper apparatus for stripping insulation from an electric cable, said apparatus comprising:
    a framework;
    a drive secured to said framework;
    a wire feeder rotatably secured to said framework and rotatably driven by said drive;
    a guide for guiding the cable towards said wire feeder;
    said guide including:
        a spacer bar extending towards said wire feeder;
        a cutter connected to said framework adjacent to said feeder, the arrangement being such that when the cable is guided by said guide towards said wire feeder, said wire feeder, spacer bar and said cutter cooperate with each other for stripping the insulation from the cable;
    said guide including:
        a base;
        a biasing arrangement for biasing said base relative to said framework;
    said spacer bar being supported by said base, said spacer bar extending towards said wire feeder for guiding the electric cable towards said wire feeder;
    said spacer bar having a thickness for stripping insulation from cables having a gauge within a first range; and
    a further spacer bar interchangeable with said spacer bar, said further spacer bar having a further thickness for stripping insulation from cables having a gauge within a second range.

13. A cable stripper apparatus as set forth in claim 10 wherein
    said guide further includes:
        a first wall secured to said base;
        a second wall secured to said base, said second wall being disposed spaced and parallel relative to said first wall so that said walls define a channel therebetween for guiding the cable towards said wire feeder.

14. A cable stripper apparatus as set forth in claim 1 wherein
said cutter includes:
a blade disposed adjacent to said wire feeder, said blade being secured to said guide so that when said wire feeder is being rotated and the cable is guided by said guide towards said blade, the cable is fed between said wire feeder and said blade so that said blade strips the insulation from the cable.

15. A cable stripper apparatus as set forth in claim 10 wherein
said cutter includes:
a blade disposed adjacent to said wire feeder, said blade being secured to said base so that when said wire feeder is being rotated and the cable is guided by said guide towards said blade, the cable is fed between said wire feeder and said blade so that said blade is biased by said biasing arrangement towards said wire feeder for stripping the insulation from the cable.

16. A cable stripper apparatus for stripping insulation from electric cable, said apparatus comprising:
a framework;
a drive secured to said framework;
a wire feeder rotatably secured to said framework and rotatably driven by said drive;
a guide for guiding the cable towards said wire feeder;
said guide including:
a base;
a biasing arrangement for biasing said base relative to said framework;
a cutter secured to said base adjacent to said feeder, the arrangement being such that when the cable is guided by said guide towards said wire feeder, said wire feeder and said cutter cooperate with each other for stripping the insulation from the cable; and
said cutter having a cutting edge disposed spaced and parallel to an axis of rotation of said wire feeder, said cutter being connected to said framework immediately adjacent to said feeder, the arrangement being such that when the cable is guided by said guide towards said wire feeder, said wire feeder, spacer bar and said cutter cooperate with each other for stripping the insulation from the cable.

17. A cable stripper apparatus for stripping insulation from electric cable, said apparatus comprising:
a framework;
a drive secured to said framework;
a wire feeder rotatably secured to said framework and rotatably driven by said drive;
a guide for guiding the cable towards said wire feeder;
said guide including:
a base which defines a hole;
a pin having a proximal and a distal end, said distal end of said pin slidably extending through said hole of said base;
said proximal end of said pin being secured to said framework;
a compression spring disposed between said base and said framework for biasing said base guided by said pin away from said framework so that said base is urged by said spring towards said wire feeder;
a cutter secured to said base adjacent to said feeder, the arrangement being such that when the cable is guided by said guide towards said wire feeder, said wire feeder and said cutter cooperate with each other for stripping the insulation from the cable; and
said cutter having a cutting edge disposed spaced and parallel to an axis of rotation of said wire feeder, said cutter being connected to said framework immediately adjacent to said feeder, the arrangement being such that when the cable is guided by said guide towards said wire feeder, said wire feeder, spacer bar and said cutter cooperate with each other for stripping the insulation from the cable.

* * * * *